United States Patent [19]

Rink et al.

[11] Patent Number: 5,582,427
[45] Date of Patent: Dec. 10, 1996

[54] DUAL-WALL PYROTECHNIC AIR BAG INFLATOR WITH TORTUOUS GAS FLOW

[75] Inventors: Linda M. Rink, Liberty; John N. Parker, South Ogden; Todd S. Parker, Centerville; Bradley W. Smith, Ogden; Brian H. Fulmer, Farr West; Scott A. Jackson, Centerville, all of Utah

[73] Assignee: Morton International, Inc., Chicago, Ill.

[21] Appl. No.: 496,041

[22] Filed: Jun. 28, 1995

[51] Int. Cl.⁶ .................................................. B60R 21/26
[52] U.S. Cl. ........................... 280/740; 280/741; 102/531
[58] Field of Search ........................................ 280/741, 740, 280/736, 742; 102/530, 531; 422/164, 165, 166

[56] References Cited

U.S. PATENT DOCUMENTS

| 3,934,984 | 1/1976 | Marlow et al. ........................ 280/741 |
| 4,578,247 | 3/1986 | Bolieau ................................. 280/741 |
| 4,943,086 | 7/1990 | Cunningham ......................... 280/741 |
| 5,189,255 | 2/1993 | Fukabori et al. ..................... 280/741 |
| 5,201,542 | 4/1993 | Thuen et al. ......................... 280/736 |
| 5,492,366 | 2/1996 | Osborne et al. ...................... 280/741 |

FOREIGN PATENT DOCUMENTS

| 5-97012 | 4/1993 | Japan ................................... 280/736 |
| 6-227358 | 8/1994 | Japan ................................... 280/736 |

*Primary Examiner*—Brian L. Johnson
*Assistant Examiner*—Peter C. English
*Attorney, Agent, or Firm*—Taylor J. Ross; Gerald K. White

[57] ABSTRACT

A dual-walled air bag inflator having a filter and gas generant within a common chamber, with the gas exiting radially from the inflator. Various arrangements are provided to force the generated gas to change its direction of travel at least 90° prior to exiting in order to slow the gas and improve filtration. Gas barriers are placed within the chamber to force the desired flow. The gas flow may be directed radially inward in opposed streams to cancel velocity, and then directed radially outward toward the filter and exits. In one embodiment a mixing chamber is provided for the gas prior to encountering the filter.

7 Claims, 1 Drawing Sheet

DUAL-WALL PYROTECHNIC AIR BAG INFLATOR WITH TORTUOUS GAS FLOW

BACKGROUND OF THE INVENTION

1. Field of the Invention

The present invention relates in general to air bag occupant supplemental restraint systems. In particular, the present invention relates to improved inflation gas flow arrangements for pyrotechnic air bag inflators of the type having two walls.

2. Description of the Related Art

Pyrotechnic air bag systems of various designs are well known. In general, such systems include an inflator which has a housing surrounding a mass of gas generant material. To initiate the gas generation, the inflator also includes a mass of initiating material and an initiator. An appropriate electrical signal will cause combustion of the initiator, or squib, which in turn causes combustion of the initiator material. The hot gasses created by the initiator impinge upon the gas generant, causing the generant to form the larger quantity of inflation gas.

This inflation gas exits the inflator and flows into the cushion of the air bag system. Continued gas flow causes the cushion to inflate and provide a compliant protective surface for the passenger. This process, from receipt of the signal to full inflation, typically takes on the order of fifty to one hundred milliseconds.

The need to produce a sufficient quantity of gas within the very short time period necessarily requires a relatively large gas pressure. This pressure results in several problems.

First, the gas exits from the inflator with a sufficient pressure that it may physically propel the entire inflator, in a manner similar to a rocket, if the inflator is not securely mounted. To prevent this, it has been known to direct the exiting gas in radial directions about the periphery of the inflator (known as a radial inflator). This results in the thrust from radially opposed gas jets cancelling out. Such designs are referred to as thrust-neutral, and are preferred.

Second, the gas generant produces a quantity of solid material during its activation. Due to the high pressure, the gas acquires a sufficiently high velocity to entrain this solid material within the gas flow. Since this solid material would be dangerous if it exited the inflator and struck the passenger, it must be sufficiently filtered. Filtration efficiency is reduced, however, by the high velocity of the gas. This is especially true in recent low-cost radial (thrust-neutral) designs.

In such designs, known as two walled designs, a first circular wall defines a central chamber for the initiator. Outside of this first wall the gas generant is placed in an annular chamber and is directly surrounded by the filter media. The filter media is in turn directly surrounded by a second, outer wall of the inflator, which includes the gas exit ports. While this design reduces the size and weight of the inflator, the gas enters directly into the filter with full velocity, reducing the efficiency of the filter.

SUMMARY OF THE INVENTION

An object of the present invention is to provide a pyrotechnic air bag inflator which provides a desired quantity of inflation gas within the necessary short time period.

Another object of the present invention is to provide such an inflator which is thrust-neutral.

A further object of the present invention is to provide such a thrust neutral inflator which has a small size and low weight.

Another object is to provide such an inflator which may provide a reduced gas velocity to provide improved filtering.

A further object of the present invention is to provide such an inflator in which the gas flow undergoes at least one 90° or greater change in direction prior to or during filtration to slow the gas and improve filtration.

Yet another object of the present invention is to provide such an inflator in which the inflation gas may expand within a volume prior to filtration in order to slow the gas and improve filtration.

Yet another object of the present invention is to provide such an inflator in which the inflation gas is directed in opposed streams prior to filtration in order to slow the gas and improve filtration.

These and other objects are achieved by an air bag inflator having a two walled design, with the filter and gas generant within a common chamber, with the gas exiting radially from the inflator. Various arrangements are provided to force the generated gas to change its direction of travel at least 90° prior to exiting in order to slow the gas and improve filtration. Gas barriers are placed within the chamber to force the desired flow. The gas flow may be directed radially inward in opposed streams to cancel velocity vectors, and then directed radially outward toward the filter and exits.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
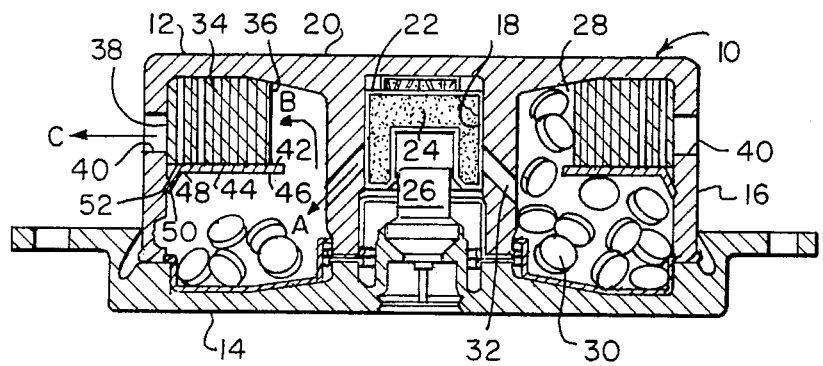
FIG. 1 is a cross-sectional side view of a first embodiment of the present invention.

With reference to FIG. 1, an inflator according to a first embodiment of the present invention is generally designated by reference numeral 10. The inflator 10 is a pyrotechnic air bag inflator for an air bag system, and as such includes a housing 12. The housing 12 is preferably formed as a cylinder, and for the embodiment shown, a short cylinder suitable for use with a driver's side air bag mounted to a steering wheel (not shown). As such, the housing will include a circular bottom wall 14, a tubular peripheral outer wall 16 and a tubular inner wall 18.

The housing also includes a circular top wall 20 which is fixed to the various tubular walls 16 and 18. The top wall is typically formed as a monolithic unit with the tubular walls, and such a combined unit is often referred to as a diffuser. This diffuser is then connected to the bottom wall (also known as a base), typically by inertia welding. These walls therefore define a series of chambers. For example, radially interior of the inner wall 18 there is formed a cylindrical ignition chamber 22 which will be partially filled with an ignition material 24, with the remainder of the volume of this chamber being filled by an initiator or squib 26. Alternatively, there may be provided only a squib of larger size, commonly known as a "super squib", without the ignition material. Either arrangement is generally referred to as ignition means.

Radially between the inner and outer walls there is formed an annular or tubular generator chamber 28 which will receive a volume of pyrotechnic gas generant material 30 (only a portion of which is shown for clarity). Such material may have various chemical compositions, such as sodium azide, and may be in granular, tablet, wafer or other forms. The inner wall 18 will include a plurality of ignition ports 32 extending between the ignition and generator chambers to permit the hot gasses from the ignition means to flow into the generator chamber, as indicated by arrow A in FIG. 1. These hot gasses initiate the gas generation in the material 30.

Also present within the chamber 28 is a filter 34 for removing solids from the gas produced by generant 30, with the flow of the gas to the filter shown by arrow B. The filter 30 includes an entrance face 36 and an exit face 38. Upon exiting the filter, the gas vents from the inflator through a plurality of circumferentially spaced exit ports 40 extending through the outer wall 16, as indicated by arrow C.

The above-described combination of components is known, and does not in itself constitute the present invention. Rather, it is the particular structural forms and interrelationships of these components, and the resultant gas flow, which defines the present invention.

While generally known, it is noted that this two-walled (i.e., walls 16 and 18) design provides a lighter weight and lower cost inflator housing compared to prior art three-walled designs, which employed the third wall between the gas generant and the filter. In such three walled designs the third wall provided opportunities for turning the gas flow, and thus likely reducing its velocity, which are simply not present in the two-walled design. With prior art two-walled radial (i.e., thrust neutral) designs, the filter was placed radially outward of the generant, and radially inward of the exit ports. With this filter placement the gasses passed directly through the filter with essentially no directional changes.

The present invention avoids the problems of the prior art, and seeks to reduce gas velocity with direction changes. The details of these direction changes are made clear in the discussion below.

The filter 34 of the present invention may take various forms. For example, the filter may be a multi-layer assembly of screens having various gauges, ceramic papers, metal felts, etc. as is known in the art. The filter could also be formed of a rigid, reticulated, monolithic filter, such as a ceramic agglomerate, or a carbonaceous, metallic or ceramic foam as described in copending U.S. patent application Ser. Nos. 08/318,367, filed Oct. 5, 1994, 08/114,211, filed Aug. 30, 1993, and 08/220,485, filed Jul. 26, 1994, all assigned to the present assignee, which are also included herein by reference.

Other suitable, substantially rigid, materials are sintered metal fiber structures available from Pall Corporation of Cortland, N.Y., and sintered powder metal structures available from Newmet Krebsoge, Inc. of Conn. Such rigid filters are preferred as their construction and placement in the housing is simplified in comparison to multi-layer filters. Additionally, such a rigid filter could be used with other layers such as an inner layer of ceramic paper or wire mesh, or a supporting outer wrap of wire mesh. Further, the exit face 38 of the filter may abut the inner face of the outer wall 16. In order to provide a plenum effect, and increase filter efficiency, however, it may be desirable to provide an annular gap between the exit face and the outer wall, as better described below.

The filter 34 is effectively, though not necessarily physically, interposed between the gas generant and the exit ports, such that the gas must pass through the filter prior to exiting the inflator. To provide the desired interposed arrangement, the filter is located such that the exit face of the filter is in communication with the exit ports of the housing. Additionally, the top and bottom of the filter are sealed against gas flow. This is preferably achieved by pressing the upper face of the filter against the top wall of the housing, and by placing a seal 42 upon the bottom face of the filter.

The filter seal 42 takes the general form of a ring or annulus. The seal includes an annular presser foot 44. The presser foot include a cantilevered edge 46 and connecting edge 48. The presser foot is placed in contact with the lower face of the filter 34, with the cantilevered edge 46 furthest from the outer wall, and the connecting edge 48 closest to the outer wall. The presser foot also serves to maintain the generant mass in its assembled condition. The seal 42 is thus directly interposed between the filter and generant. The length of the foot 44 is preferably such that it extends radially across at least a majority of the radial span of the filter, and most preferably across the entire radial span, as shown.

Connected to the connecting edge 48 of the presser foot is an angularly oriented engagement leg 50 having a free edge 52. As shown in FIG. 1, the leg 50 (or at least a portion thereof) is placed in contact with the housing wall when assembled in the housing. This contact is a relatively tight interference fit.

To ensure that the proper fit is achieved without the need for close tolerances, the leg 50, prior to insertion into the housing and the assembled position shown, forms an obtuse angle with respect to the foot 44, with the diameter of the free edge 52 being larger than that of the housing wall. Since the connecting edge 48 is closest to the housing wall when assembled as in FIG. 1, the free end of the leg will thus at least tend to extend toward the housing wall. Furthermore, the seal 42 is formed of a material having some amount of resilience, such as sheet metal. A band of sheet metal may thus be plastically deformed to the unassembled configuration, yet still provide a sufficient amount of resilience to permit the leg 50 to be resiliently deformed when placed within the diameter of the housing wall.

As may be envisioned, during this insertion the leg 50 will resiliently deform, reducing the obtuse angle. As such, the natural resilience of the leg will create a force against the housing walls which will resist the movement of the seal 42. This force should of course be sufficient to resist all unintentional movement yet allow the insertion of the seal. Additionally, the seal may be sized and formed such that the angle remains an obtuse angle even after insertion. As such, attempts to move the seal in a direction opposite to that of insertion will cause the free edge 52 of the leg to "dig" into the housing wall, further resisting movement. As such, the seal may press upward upon the filter to ensure that the upper end of the filter remains pressed against the top wall for sealing.

As is shown in FIG. 1, and in contrast to standard radial-flow inflators, the radial span of the seal and filter is substantial. In particular, this radial span is such that the filter and seal extend across a substantial portion (approximately 30–40%), and preferably a majority, of the radial span of the generator chamber 28. This may also be expressed by stating that the entrance face 36 of the filter is radially interior to a substantial portion, and preferably a majority, of the gas generant 30. In other words, a portion, and preferably a majority (and most preferably the entirety) of the generant is radially exterior of the entrance face of the filter.

This necessarily results in the gas produced by this generant having to travel radially inward past the entrance face 36, longitudinally toward the entrance face (upward this embodiment), and then radially outward to enter the entrance face and pass through the filter. As such, the gas must make two 90° turns, likely reducing its velocity with each turn to thus improve filtering efficiency.

It is acknowledged that some of the generant is radially aligned with the entrance face, such that only a single 90° turn is effected for this portion of gas. Further, as shown in the right-hand side of FIG. 1, a portion of the generant 30 is radially interior of the entrance face 36. The gas produced by this portion of generant will undergo no direction changes at all. However, both of these portions of gas are relatively small, with a substantial portion, and preferably a majority, of the gas being forced to make at least one, and preferably more, direction changes.

Again, these changes in direction occur within a two-walled inflator housing. It is acknowledged that the seal acts as a deflector for the gas, forcing it to enter the entrance face, and that this is true of all seals for inflator filters. However, in this invention the difference is the radial extent. The large radial extent of the filter and seal of the present invention place the entrance face at the inventive position to force the desired directional flow changes.

It is noted that the large radial extent of the seal should not reduce the effectiveness of the seal, even when the seal is formed of relatively resilient material, such as sheet metal. Specifically, upon activation, the pressure within the generant chamber will rise rapidly due to creation of the gas. This pressure increase is released through the exit ports, which are downstream of the filter. As such, there will be a higher pressure in the generator chamber 28 than in the filter 34, causing a pressure differential on the seal which tends to force the seal against the filter, increasing the seal's effectiveness.

Figure 2:
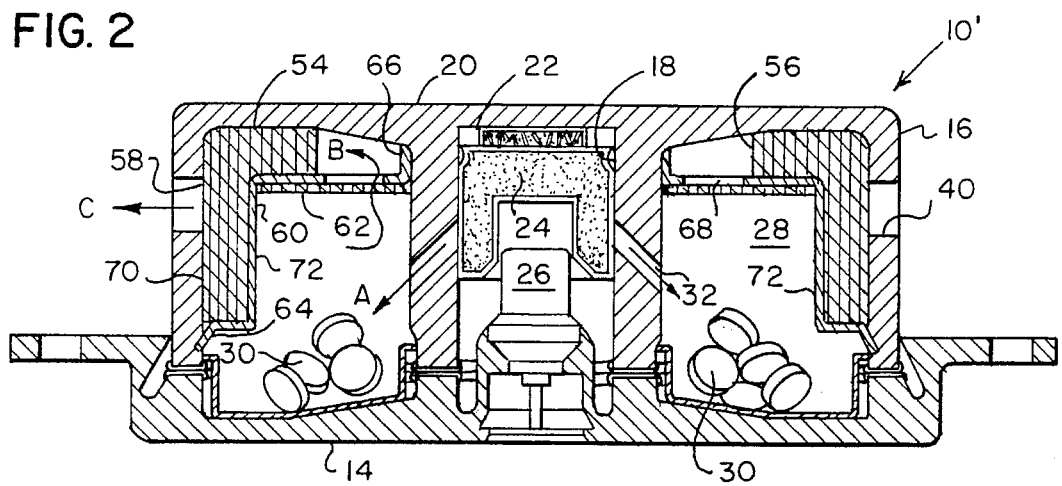
FIG. 2 is a cross-sectional side view of a second embodiment of the present invention.

With reference to FIG. 2, a second embodiment of an inflator according to the present invention is shown, and is generally identified by reference numeral 10'. This embodiment includes numerous elements in common with the first embodiment, with these like elements being designated by like reference numerals.

Of particular interest is the filter 54. As with the first embodiment, the filter may be formed of a plurality of prior art layers, a rigid one-piece element as noted, or a combination. For this embodiment, a multi-layered filter is shown.

Also as with the first embodiment, the filter includes an entrance face 56 and an exit face 58. Further, the filter is sealed at its upper face by abutment with the top wall 20 and is sealed at its bottom face by an annular seal 60. The seal 60 is formed of materials, and includes sections, similar to that in the first embodiment, such as a presser foot 62 and engagement leg 64 which operate in a similar manner to maintain the seal and filter in position.

Despite these similarities, the differences between the first and second embodiments lie primarily in the seal. One difference in the seal of this embodiment is that the seal extends radially inward of the filter entrance face, and is sufficiently close to the inner wall 18 to block passage of the generant. In this manner the generant is not permitted to be interposed radially between the entrance face of the filter and the inner wall. As may be seen, this eliminates the possibility of gas from such generant entering the filter without at least one 90° direction change.

If the seal is formed of a sufficiently rigid material it may be provided with a free cantilevered inner edge (not shown). However, to maintain the resiliency desired at the engagement leg, it may be necessary to provide additional support at the radially inner end. To this end, the cantilevered edge of the seal may mount a support leg 66 which extends upward to abut against the inner face of the top wall 20. The support leg will take the general form of a tubular segment, and may also abut against the inner wall 18, as shown in FIG. 2.

The presence of the support leg, abutting against the top wall, will of course form a seal against gas ingress. To permit the necessary flow of gas to the filter, there will therefore be provided one or more seal ports 68 extending through the seal at positions radially inward of the entrance face of the filter. This radial placement is of course necessary to maintain the desired change in direction of the gas flow. These filter ports may be placed in the presser foot and/or support leg sections of the seal, as desired.

In the embodiment of FIG. 2, a second variation is made to provide additional changes in gas flow. This variation is the shape of the filter and relative longitudinal position of the presser foot and exit port.

In particular, the presser foot of the seal is longitudinally higher than the exit ports, such that the gas flow must change direction to move longitudinally downward and then change direction again to flow radially outward to the exit port. The filter of this embodiment includes an appropriate longitudinal extension portion 70, as does the presser foot, in the form of vertical offset 72. As may be seen, the changes in gas flow direction imposed by the offset of the presser foot and exit ports occurs within the confines of the filter, rather than prior to encountering the entrance face of the filter. As such, these changes work to improve filtration efficiency only in those sections of the filter which are downstream of the imposed direction changes. However, filtration efficiency is still believed to be improved.

As shown in FIG. 2, the extension portion 70 of the filter extends downward beyond the longitudinal position of the exit ports 40. This arrangement may also improve filtration efficiency, as it may serve to improve diffusion of the gas flow. Specifically, the darker vertical bands within the multi-layer filter shown in FIG. 2 represent filter paper (typically a ceramic), while the patterned vertical bands represent layers of mesh. The increased vertical extent of the filter, and in particular the mesh layers, in the offset portion may serve to create plenum chambers upstream of layer of paper (which has a higher pressure drop than the mesh). The mesh thus serves to diffuse the gas flow before passing through the filter paper layers, increasing filter efficiency.

Figure 3:
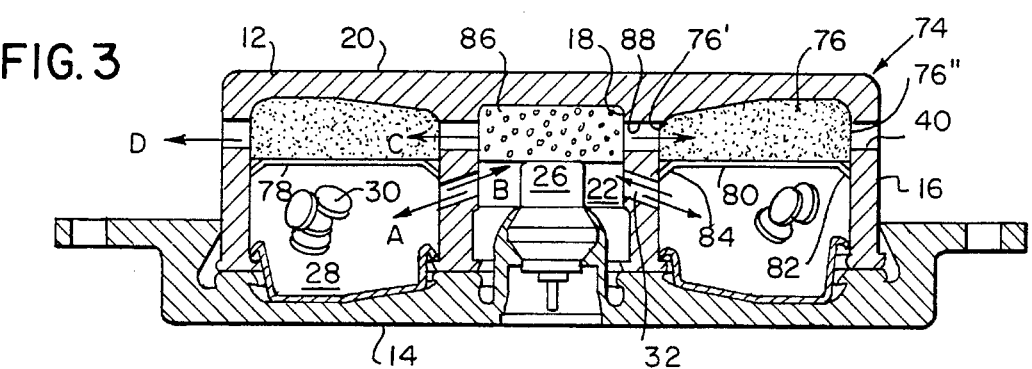
FIG. 3 is a cross-sectional side view of a third embodiment of the present invention.

With reference to FIG. 3, a third embodiment of the present invention is shown, with this inflator being generally designated by reference numeral 74. Again, this embodiment includes many features in common with the previous embodiments, with like elements identified with like reference numerals.

In this embodiment a solid, one-piece filter 76 is shown, although a multi-layered filter could be employed. As with the previous embodiments, the filter 76 includes a radially innermost entrance face 76' and a radially outermost exit face 76". The filter in this embodiment is shown extending the entire radial span of the chamber 28. As such, the entrance face 76' is radially interior of a majority of the generant, and more specifically, is interior of essentially the entirety of the generant. By "essentially the entirety", it is meant that manufacturing tolerances in the diameter of the inner wall and the inner diameter of the filter may result in slightly less than 100% of the generant being radially exterior.

While the filter is shown as extending the entire radial span, lesser spans could be employed, such as a reduced outer diameter discussed more fully with regard to the next embodiment. An increased inner diameter is also feasible, so long as the filter may remain properly positioned in the housing. The reduced radial filter span or depth in this embodiment (and the next) is acceptable so long as sufficient filtering is provided. To achieve this will typically require that the entrance face of the filter be radially interior of a majority of the generant.

As in the previous embodiments, this filter is secured in position by a seal 78. The seal 78 is similar to the previous seals in that it includes a presser foot 80 and an engagement leg 82 at its radially exterior (i.e., connecting) edge. Similar to the second embodiment, the seal 78 extends the entire radial span of the chamber 28. While a support leg could be employed at the radially interior edge, in this embodiment there is provided a second, interior engagement leg 84. The interior engagement leg is substantially identical to, and operates in an identical manner as, the exterior engagement leg 82 described above. As may be seen, these legs will securely retain the seal, and thus the filter, in position.

It is noted that a further difference in this embodiment is that the seal 78 is a true seal, and prevents gas flow therethrough. Specifically, seal 78 is gas impervious, and provides a substantially gas impervious seal with the inner and outer walls of the housing. There are no ports in the seal 78. This is so because this third embodiment provides a gas flow which is yet more tortuous than that of the previous embodiments. Specifically, the gas created in chamber 28 flows back into initiator chamber 22.

By way of explanation, it is noted that the ignition chamber 22 initially contains the usual squib 26, and a mass of pyrotechnic initiator 86. The initiator 86 may be similar to that in the previous embodiments, and be contained within a rupturable cup or container. However, in this embodiment gas flow in the chamber 22 is of concern, and specifically must be sufficiently unrestricted after activation of the initiator material 86. While placing the material in a cup or container may provide such flow after activation, it may be desirable to place the initiator material in the chamber 22 without further covering.

To this end, the initiator material may be formed into a cohesive mass, such as shown in FIG. 3. If the material is maintained in the form of loose granules, etc., then the initiator ports 32 will of course need to be sealed, such as by a layer of foil (not shown), at their upstream ends to prevent dispersal of the granules. As a further alternative, the initiator material could simply not be used, and the squib 26 could be of sufficient power to initiate the generant by itself (i.e., use a so-called "super squib"). Each of these options may again be generally referred to as ignition means.

In any event, ignition means are provided to initiate the generant 30, but will thereafter be sufficiently sacrificed or reacted such that it does not constitute a significant restriction on gas flow through the chamber 22. The chamber 22 will additionally contain a further set of ports, in the form of channel ports 88. The channel ports extend through the inner wall 18 at a position above the seal 78, and as such provide communication between the ignition chamber 22 and the section of the generant chamber 28 containing the filter.

As may be envisioned, upon receipt of the appropriate electrical signal, the ignition means will activate, sending hot gas from the ignition chamber 22 to the generant chamber 28 via the initiator ports 32, as indicated by arrow A in FIG. 3. These hot gases will initiate the generant material 30, causing this material to generate the inflation gas. The inflation gas will then pass back into the ignition chamber 22 via the initiator ports 32, as indicated by arrow B. It is noted that in this embodiment again the gas will initially travel radially inward.

Within the ignition chamber 22 the gas streams from the ports may impinge upon the squib 26, or upon an opposite wall of the chamber, thus likely reducing their velocity. These gas streams may also meet at the middle of the chamber to impinge against each other, such that their velocities will likely tend to neutralize each other, which would reduce their velocity. The gas then must turn radially outward, through an angle approaching 180°, to pass through the channel ports 88, as indicated by arrow C. The gas then enters the entrance face of the filter 76, passes through the filter, and then finally exits the inflator via the exit ports 40, as indicated by arrow D.

As may be seen, the ignition means is in direct communication with the filter via the channel ports 88. As such, a portion of the initiation gas may pass into the filter, rather than into the generant chamber. This will reduce the ignition efficiency of the inflator, and, depending upon the filter, may damage the filter. To reduce or eliminate this, there may be provided a frangible seal, such as a foil, on the channel port to prevent gas flow during activation of the initiating means, but which will rupture upon generation of the inflation gas. Such a seal may take the form of a foil bonded to the inner face of inner wall 18, over the channel ports.

With this arrangement the generated gas travels a greater distance, and has a much more tortuous flow than previous designs flowing only radially outward. Additionally, the gas is permitted to expand into the increased volume provided within the inner wall 18. This increase in distance, volume and direction changes likely reduces the velocity of the gas to improve filtration efficiency. These increases are, again, all achieved within the confines of a two-walled housing having reduced size and weight.

Figure 4:
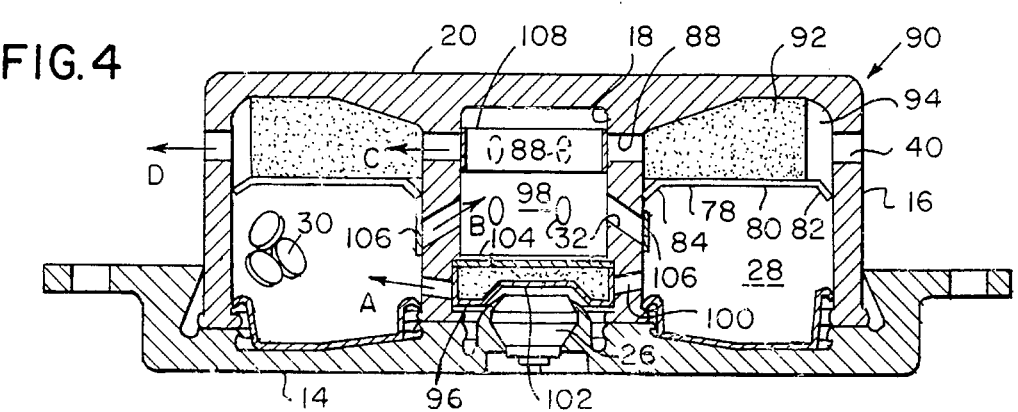
FIG. 4 is a cross-sectional side view of a fourth embodiment of the present invention.

A final variation is shown in FIG. 4, where a fourth embodiment of an inflator according to the present invention is generally designated by reference numeral 90. Again, many of the components in this embodiment are identical to those of previous embodiments, with like elements identified with like reference numerals.

This embodiment, as with the previous embodiment, includes a filter 92. The filter 92 is shown as a solid, one-piece filter, although a multi-layered filter could be used. This embodiment shows the use of a filter having a reduced outer diameter to create a void area 94 between the filter exit face and the exit ports 40 which acts as a plenum chamber. Specifically, the void area maintains a reduced pressure essentially equal to that of the exit ports around the entirety of the filter. This is in contrast to traditional filters which would abut against the outer wall 16, creating such reduced pressure areas only directly over the ports. With the void area, the gas will pass uniformly through the filter, using a much larger area, thus increasing filtration efficiency. While this arrangement is preferred, it is not required.

As with the previous embodiment, the filter is retained by use of a seal 78 which fully seals the filter. The main difference in this embodiment is the arrangement of the initiating means and the radially innermost sections of the inflator.

Specifically, in this embodiment the ignition chamber is split into two separate compartments, initiating compartment 96 and mixing compartment 98. The initiating compartment must of course be in communication with the generant chamber 28, and as such a series of primary ports 100 extend through the inner wall 18. The mixing chamber is provided with communication to the generant chamber via the common initiating ports 32 (though these ports no longer conduct initiating gasses) and with communication to the filter via the channeling ports 88.

The operation of this fourth embodiment is similar to the previous embodiment. In particular, an appropriate electrical signal will activate the initiating means, causing the hot initiating gasses to flow from the initiating compartment 96 to the generant chamber 28 via the primary ports 100, as indicated by arrow A in FIG. 4. It is noted that the initiating gasses do not enter the mixing chamber (at least directly). The initiating gases start the gas production of the generant 30. This inflation gas travels radially inward to the mixing compartment 98 via the initiation ports 32, as indicated by arrow B.

As before, the streams of gas entering the mixing compartment will collide with each other and/or the walls to cancel likely out their velocity, reducing the overall velocity of the gas. Additionally, the gas has expanded into the increased volume provided by the mixing compartment. Thereafter, the gas will flow radially outward to the filter 92 via the channel ports 88, as indicated by arrow C. Finally, after passing through the filter, the gas will leave the inflator via the exit ports 40, as indicated by arrow D.

As may be seen, the inflation gases again travel radially inward, collide, turn, and flow radially outward, moving through a direction change approaching 180°. Additionally, in this embodiment the mixing compartment is free of obstruction, such that the flow is unperturbed, and is more likely to cancel out velocity by collision at the center of the compartment. Furthermore, the highly energetic activation of the initiating means takes place remote from the mixing compartment. As such, the mixing compartment will be cooler in this embodiment, and will serve to cool the gas more, again improving filter efficiency.

While this embodiment provides advantages, it does require formation of the separate mixing and initiation compartments, each of which must be sufficiently strong to maintain structural integrity, yet must fit within the confines of the inner wall. Various arrangements are possible for providing the necessary structure.

For example, rather than forming the diffuser monolithically as shown, the inner wall 18 could be an extension of the bottom wall 14. This would permit formation of a monolithic wall between the mixing and initiation compartments during the process of forming the bottom and inner walls. The ports 32, 88 and 100 could all be easily drilled, and then the upper end of this inner wall could be inertia welded to the top wall during the welding process described above.

As another example, the diffuser could remain integral with the inner wall, but the initiating means could include a mass of initiating material 24 held within a container 102. The container 102 would have an upper face 104 sufficiently rugged to hold against activation, such that the initiation gases are expelled only from the sides through the primary ports, rather than into the mixing compartment. The container 102 could be held in position by a close interference fit within the inner wall 18. To aid in positioning, the inner wall could be formed with a shoulder against which the upper face abuts, as shown in FIG. 4. With this arrangement the ports would be formed in the inner wall in the usual manner, such as by angling a drill from inside or outside the inner wall of the unassembled diffuser.

This embodiment also lends itself to adjustment of the pressures within the inflator to alter and improve inflator performance. For example, a frangible seal 106, such as a foil, may be placed over the entrance of the initiation ports 32 to prevent flow of the gas into the mixing compartment until a predetermined pressure has been reached. Alternatively or additionally, a similar frangible seal 108 may be placed over the entrance of the channel ports to maintain the inflation gas within the mixing compartment until a predetermined pressure is achieved.

As should be clear, each of the inflators of this invention provides a simple, light weight, two-walled design. Additionally, each of these inflators provides a tortuous flow path for the inflation gas prior to meeting the entrance face of the filter, to try to reduce the velocity of the gas and improve filter efficiency. These tortuous gas flows are achieved by forming and placing the filter such that the entrance face of the filter is radially interior to at least a substantial portion, preferably a majority, and possibly the entirety, of the gas generahr. This forces the generated gas to flow inward and outward, which is intended to reduce its velocity.

While the filtration efficiency has been discussed above, the present embodiments also have other beneficial effects. For example, each of these arrangements provides a radial expulsion of the gas, such that the inflator is thrust-neutral. Additionally, the size and placement of the filters within the annular chambers provides a more efficient shape for ignition of the generant mass.

Specifically, in each of the embodiments above, the chamber 28 holding the generant surrounds the ignition means, and the ignitor gas will vent through the ignition ports. At least for certain generant formulations, this ignitor gas is most effective when it directly impinges upon the generant 30. In this regard it is noted that the ignition gas will exit the ports at high velocity and with considerable force. As such, those areas in the generant chamber 28 which are in radial line with the ignition ports 32 (or primary ports 100) will provide an excellent response, with areas further from such radial lines providing progressively worsened response.

Considering this, a very effective shape for the generant chamber would be a short and relatively wide tube, as this would provide the largest volume for the generant chamber with the least distance from the radial lines. Such a shape is inherently formed with the embodiments of the present invention, due to the large radial extent of the filter and seal. In contrast, the radial-type housings of previous designs, with the filter radially exterior of the generant provide a less efficient chamber shape. Specifically, the placement of the filter at the radial face results in a tall, thin tube shape for the generant chamber. As such, the generant at the upper and lower longitudinal extremes of these chambers is not provided with a good supply of the igniting gas, and does not respond as desired. As such, the present embodiments, in addition to reducing gas velocity for improved filtration, also inherently provide good ignition response.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A dual-wall pyrotechnic air bag inflator, comprising:

a housing including; spaced, opposed top and bottom walls, a tubular inner wall defining a longitudinal axis, a tubular outer wall coaxial with said inner wall, said inner and outer walls extending between said top and bottom walls to define a cylindrical ignition chamber within said inner wall and an annular generant chamber between said inner and outer walls, said inner wall including a plurality of ignition ports and said outer wall including a plurality of exit ports, and wherein said ignition chamber is divided into discrete initiating and mixing compartments, said initiating and mixing compartments having no direct gas communication therebetween;

ignition means mounted within said ignition chamber, within said initiating compartment;

a mass of generant for creating an inflation gas received within said generant chamber;

a filter received in said generant chamber, said filter having an entrance face and an exit face, said exit face being in communication with said exit ports;

a plurality of channel ports and primary ports in said inner wall, said primary ports communicating between said initiating compartment and said mass of generant, said ignition ports communicating between said mass of generant and said mixing compartments, and said channel ports communicating between said mixing compartments and said entrance face of said filter; and a seal longitudinally and directly interposed between said mass of generant and said filter said seal extending the entire radial span of said generant chamber.

2. An inflator as in claim 1, wherein said ignition means includes a mass of initiating material held within a container, said container having an upper face which divides said ignition chamber into said initiating and mixing compartments.

3. An inflator as in claim 1, further including a frangible seal blocking said ignition ports.

4. An inflator as in claim 3, further including a frangible seal blocking said channel ports.

5. An inflator as in claim 1, further including a frangible seal blocking said channel ports.

6. A dual-wall pyrotechnic air bag inflator, comprising:

a housing including; spaced, opposed top and bottom walls, a tubular inner wall defining a longitudinal axis, a tubular outer wall coaxial with said inner wall, said inner and outer walls extending between said top and bottom walls to define a cylindrical ignition chamber within said inner wall and an annular generant chamber between said inner and outer walls, said inner wall including a plurality of ignition ports and said outer wall including a plurality of exit ports;

ignition means mounted within said ignition chamber;

a mass of generant for creating an inflation gas received within said generant chamber;

a filter received in said generant chamber, said filter having an entrance face and an exit face, said exit face being in communication with said exit ports, and said entrance face being in direct communication with said mass of generant and radially interior of a substantial portion of said mass of generant; and a seal longitudinally and directly interposed between said mass of generant and said filter, and with said filter interposed between said seal and said top wall, a plurality of seal ports extending through said seal, said seal ports being spaced from said top wall a distance less than a distance between said exit ports and said top wall, and said seal further including a radially inner edge and a support leg extending from said inner edge to said top wall.

7. An inflator as in claim 6, wherein said seal further includes, intermediate said radially inner edge and a radially outer edge, a vertical offset in the form of a tube coaxial with said walls, and wherein said filter further includes a longitudinal extension portion, said longitudinal extension portion of said filter being interposed between said vertical offset and said exit ports.

* * * * *

UNITED STATES PATENT AND TRADEMARK OFFICE
CERTIFICATE OF CORRECTION

PATENT NO. : 5,582,427
DATED : 10 December 1996
INVENTOR(S) : L.M. Rink, J.N. Parker, T.S. Parker, B.W. Smith, B.H. Fulmer and S.A. Jackson It is certified that error appears in the above-indentified patent and that said Letters Patent is hereby corrected as shown below:

At column 10, line 29, "generahr" should be --generant--.

At column 11, lines 38, 39 and 40, "compartments" should be --compartment--.

Signed and Sealed this

Nineteenth Day of August, 1997

Attest:

BRUCE LEHMAN

Attesting Officer　　　Commissioner of Patents and Trademarks